US012717833B2

(12) United States Patent
Chen et al.

(10) Patent No.: US 12,717,833 B2
(45) Date of Patent: Aug. 25, 2026

(54) TASK INFERENCE USING AN ARTIFICIAL INTELLIGENCE (AI) INTERFACE

(71) Applicant: Zoom Video Communications, Inc., San Jose, CA (US)

(72) Inventors: Lang Chen, Suzhou (CN); Zijian Li, Wuxi (CN); Yike Liu, Santa Clara, CA (US); Ying Lu, Cerritos, CA (US); Jihong Xiong, Suzhou (CN); Shengjie Xu, Hangzhou (CN); Keping Zhai, Suzhou (CN); Haoming Zhong, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 120 days.

(21) Appl. No.: 18/788,828

(22) Filed: Jul. 30, 2024

(65) Prior Publication Data

US 2026/0037565 A1 Feb. 5, 2026

(51) Int. Cl.

| | |
|---|---|
| ***G06F 16/34*** | (2025.01) |
| ***G06F 16/334*** | (2025.01) |
| ***H04L 51/02*** | (2022.01) |

(52) U.S. Cl.

CPC ........ *G06F 16/345* (2019.01); *G06F 16/3344* (2019.01); *H04L 51/02* (2013.01)

(58) Field of Classification Search

None

See application file for complete search history.

(56) References Cited

U.S. PATENT DOCUMENTS

| | | | | |
|---|---|---|---|---|
| 12,008,332 | B1 * | 6/2024 | Gardner | G06F 40/56 |
| 2024/0394285 | A1 * | 11/2024 | Cunningham | G06F 40/30 |
| 2024/0403567 | A1 * | 12/2024 | Dressler, II | H04L 51/02 |
| 2024/0406166 | A1 * | 12/2024 | Bell | G06N 3/045 |
| 2024/0419706 | A1 * | 12/2024 | Gutierrez | G06F 3/0484 |
| 2024/0428008 | A1 * | 12/2024 | Abraham | G06F 40/35 |

OTHER PUBLICATIONS

International Search Report and Written Opinion for PCT/US2025/036207 mailed Oct. 21, 2025.

Gebreab et al., "LLM-Based Framework for Administrative Task Automation in Healthcare", 2024 12th International Symposium On Digital Forensics And Security (ISDFS), IEEE, Apr. 29, 2024; pp. 1-7.

* cited by examiner

*Primary Examiner* — Peter Vincent Agustin

(74) *Attorney, Agent, or Firm* — Kilpatrick Townsend & Stockton LLP

(57) ABSTRACT

Techniques for implementing task inference using an AI interface are disclosed. In an example method, a computing system receives, from a first client device, a first chat message. The computing system determines, using a language model, a task based on the first chat message, the task including one or more executable instructions. The computing system outputs, to the first client device, information about the task. The computing system receives, from the first client device, a first indication to perform the task. The computing system outputs one or more commands to cause an execution of the one or more executable instructions of the task and a generation of a task output. The computing system outputs, to the first client device, the task output.

20 Claims, 9 Drawing Sheets

TASK INFERENCE USING AN ARTIFICIAL INTELLIGENCE (AI) INTERFACE

FIELD

The present application generally relates to interactive digital communications, and more particularly relates to techniques for task inference using an AI interface.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
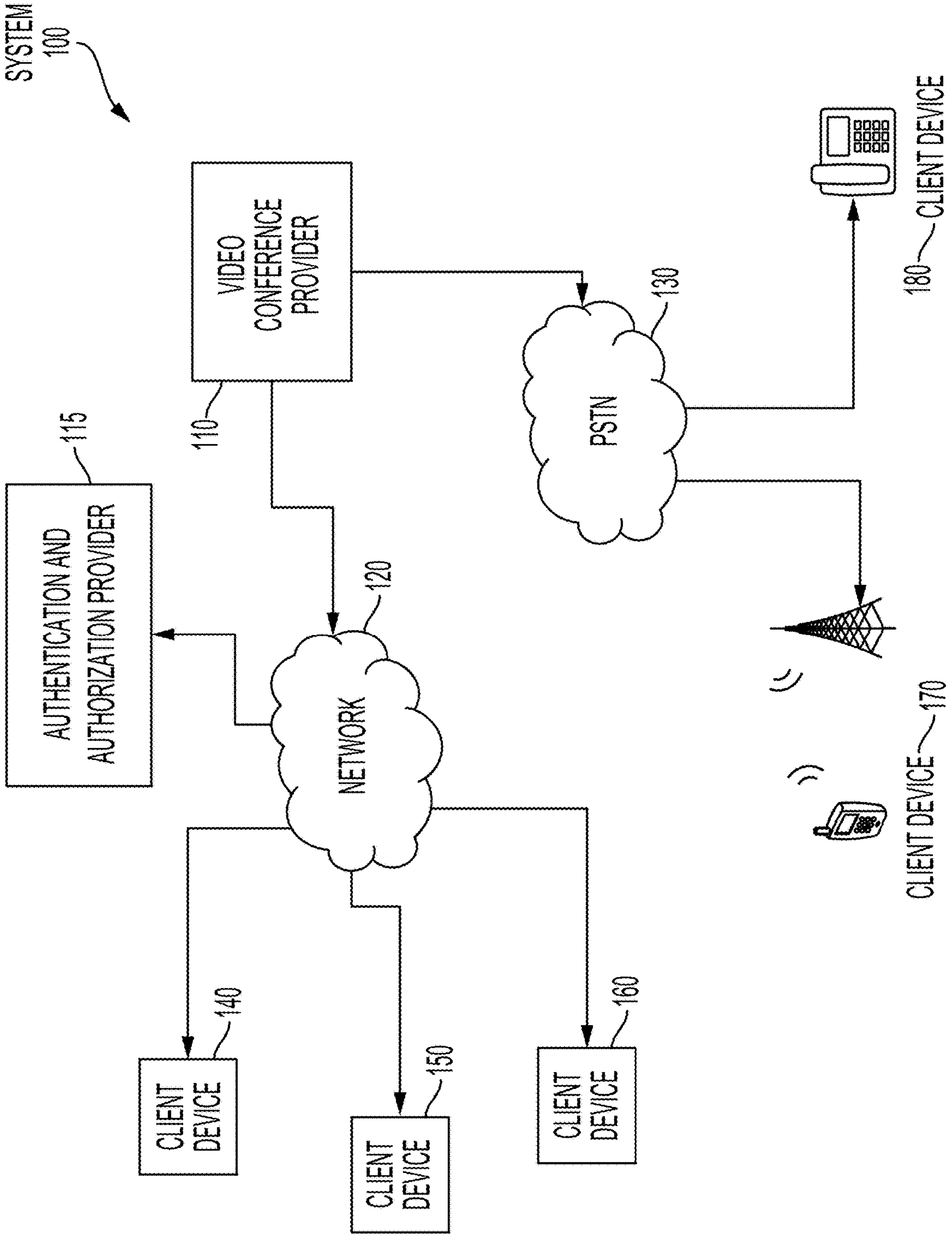
FIG. 1 shows an example system that provides videoconferencing functionality to various client devices, according to some aspects of the present disclosure.

Examples are described herein in the context of techniques for inferring tasks using an AI interface. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is commonly used for various personal and enterprise applications. Modern video conferencing platforms can also enable far more than video conferencing. For example, video conferencing platforms may also function as communications hubs including services for email, messaging, chat, whiteboarding, calendaring, among many other modes of digital communication, in addition to fully featured video conferencing suites.

During a digital communication interchange, information may be exchanged with which a task may naturally be associated. For example, during a chat conversation, one participant may explicitly direct or request a summary of a document from another participant. As a result, the other participant can generate a summary of the document, whether manually or using a computation technique. In another example, during a video conference, one participant may ask another participant to schedule a meeting. As a result, the other participant may use a calendar application to schedule the meeting, as requested.

Video conferencing platforms are increasingly being integrated with artificial intelligence ("AI") technologies to extend the capabilities of the digital communications services. For example, a video conferencing platform may be integrated with a large language model ("LLM") to provide services such as summarization, analysis, translation, knowledge base search, and so on. Some existing video conferencing platforms may provide services that utilize LLMs as interfaces for task performance. For example, the LLM interface can be directed to perform the summarization or scheduling tasks from the examples above.

An LLM interface for receiving tasking has a number of shortcomings. In some examples, the LLM user interface ("UI") may be disjoint from the chat or video conferencing UI, requiring the participant to switch to another window or use an intrusive dialog window, resulting in lost context. In some examples, the LLM interface can be integrated into the base UI. For instance, the LLM can be added as a synthetic participant to a chat channel and then directed to perform tasks, as if the LLM were a human participant. However, such an interface can be disruptive of the ongoing conversation and require undesirable breaks in the flow of dialog because they may require participants to direct unnatural imperatives to the synthetic participant. These intrusive UI features and interfaces can result in a poor user experience and add to the computational load on client devices.

To address these difficulties, a user may employ an example AI interface for task inference according to this disclosure. Increasingly, users will expect interactions with AI such as LLMs to flow in a manner akin to a natural conversation. In one example, an LLM can be integrated into a chat channel and configured to analyze each digital communication. The LLM can infer whether a task is implied, suggested, recommended, or otherwise indicated by the communication and then be directed to execute the task.

The following non-limiting example is provided to introduce certain concepts. The example involves two participants, a first participant and a second participant, in a chat channel provided by a video conference provider. In the example, the video conference provider receives, from a client device, a chat message. The chat message may be a part of a routine communication between the chat participants. For example, the first participant, using the client device, may ask the second participant a question about a document such as "Did you see the document I emailed yesterday?"

The video conference provider then determines, using an LLM, a task based on the chat message. In this example, the task of summarizing the document may be inferred by an LLM prompted to infer any tasks suggested by the communication. The LLM further determines that the task involves executable steps or instructions such as searching for the document, downloading the document, converting the document, providing the document to a summarization service (such as another LLM), and outputting the summarization.

The video conference provider outputs, to the client device, information about the task. For example, the LLM may provide information about the task such as a description of the task or executable steps or instructions for completing the task in the form of a human-readable response, which can then be relayed to the client device by the video conference provider. For example, the video conference provider may output to the client device "I heard you mention a document. Would you like for me to summarize the document for you?" to be displayed in the chat channel.

The video conference provider receives, from the client device, a first indication to execute the task in response to the human-readable information about the task. For instance, the user of the client device may simply reply, "Yes, please!" in the chat channel. The video conference provider then outputs commands to cause execution of the task. The video conference provider may, in this example, execute the steps determined by the LLM including searching for and downloading the document, and then providing the document to a summarization service. The video conference provider outputs, the task output (e.g., the summarization) to the client device. The techniques have thus enabled the completion of the inferred task by the LLM without a specific directive to do so.

In addition to the improved user experience exemplified above, examples according to this disclosure for inferring tasks using an AI interface can result in faster execution of those inferred tasks, reducing or eliminating delay due to requiring explicit direction or use of an alternative interface, and generally provide improvements in systems that provide interactive digital communications or processing. The examples of AI or LLM-based interfaces described herein can also improve the speed and efficiency with which tasks can be enqueued or requested. Because tasks can be inferred from digital communications, the extra steps associated with explicit requests can be eliminated.

The functioning of computers themselves can be improved through enhanced resource allocation and load balancing. By shifting the task origination to the video conference provider, the ordering and timing of the execution of the tasks can be dynamically allocated based on the real-time system load on the video conference provider and not limited by the happenstance order in which explicit requests may arrive. As a result, computational resources can be conserved through lower processing or memory consumption.

These illustrative examples are given to introduce the reader to the general subject matter discussed herein and the disclosure is not limited to these examples. The following sections describe various additional non-limiting examples of techniques for inferring tasks using an AI interface.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
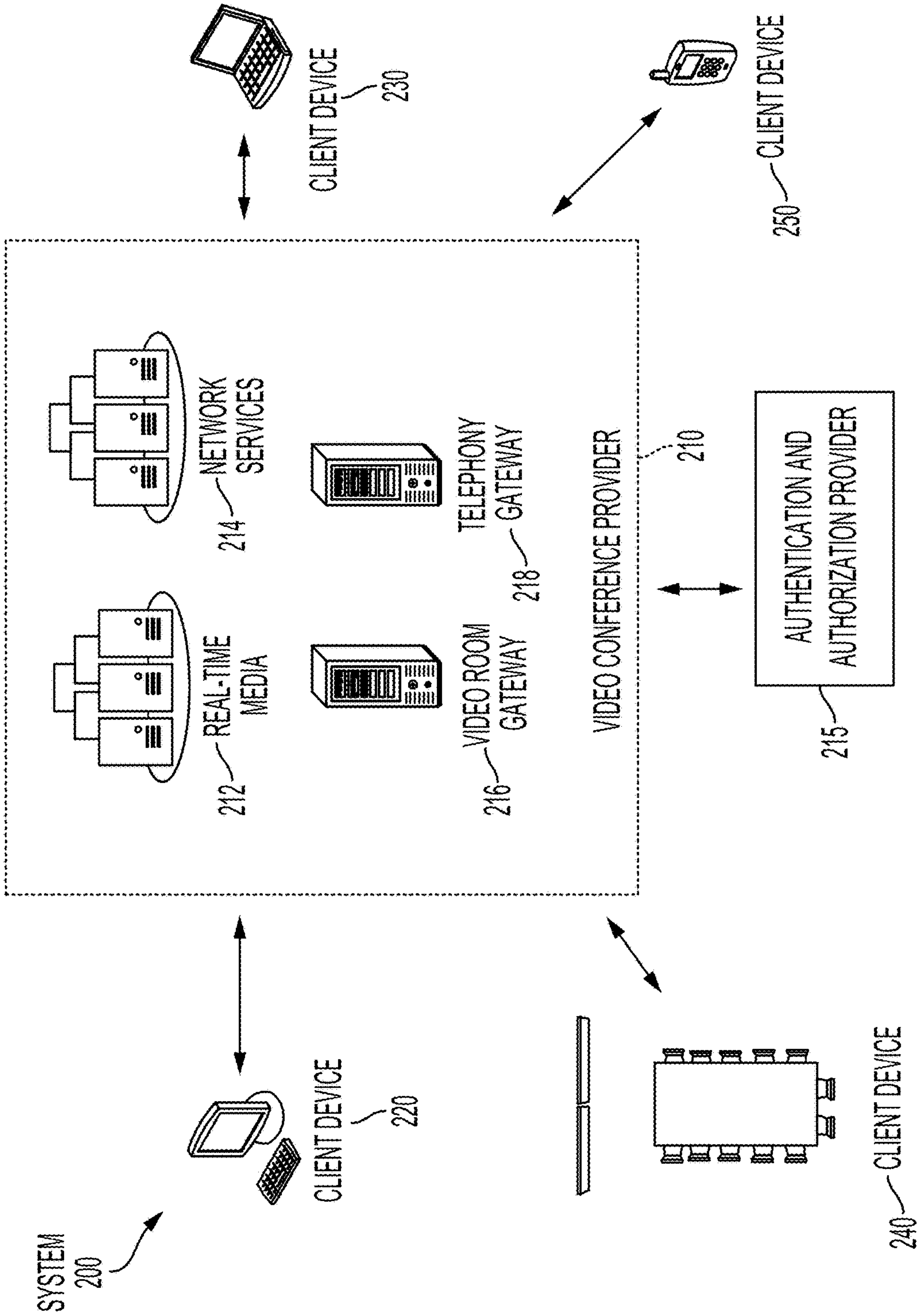
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
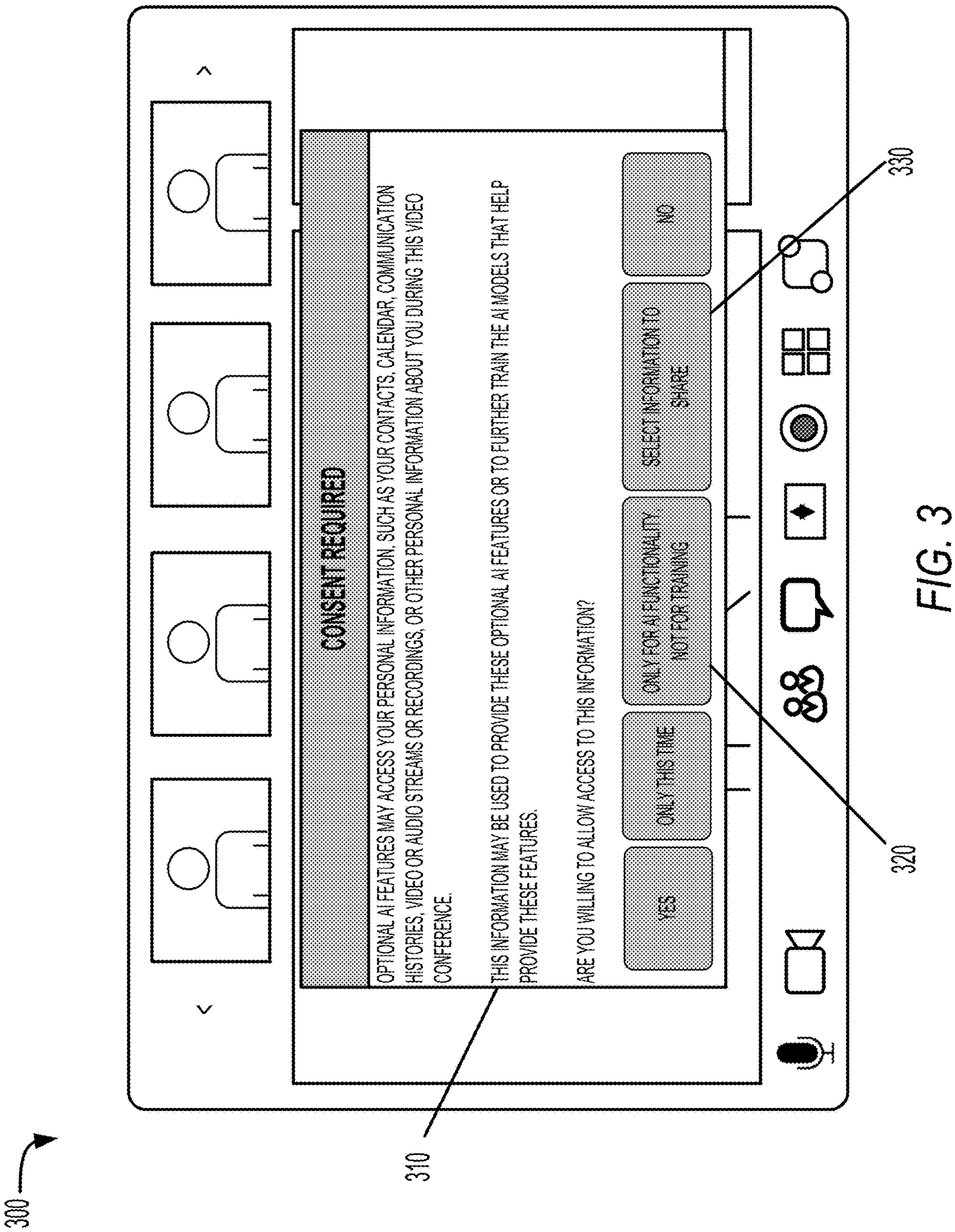
FIG. 3 shows an example user interface that may be used in some example systems configured for task inference using an AI interface, according to some aspects of the present disclosure.

Turning next to FIG. 3, FIG. 3 shows an example user interface 300 that may be used in some example systems configured for task inference using an AI interface. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
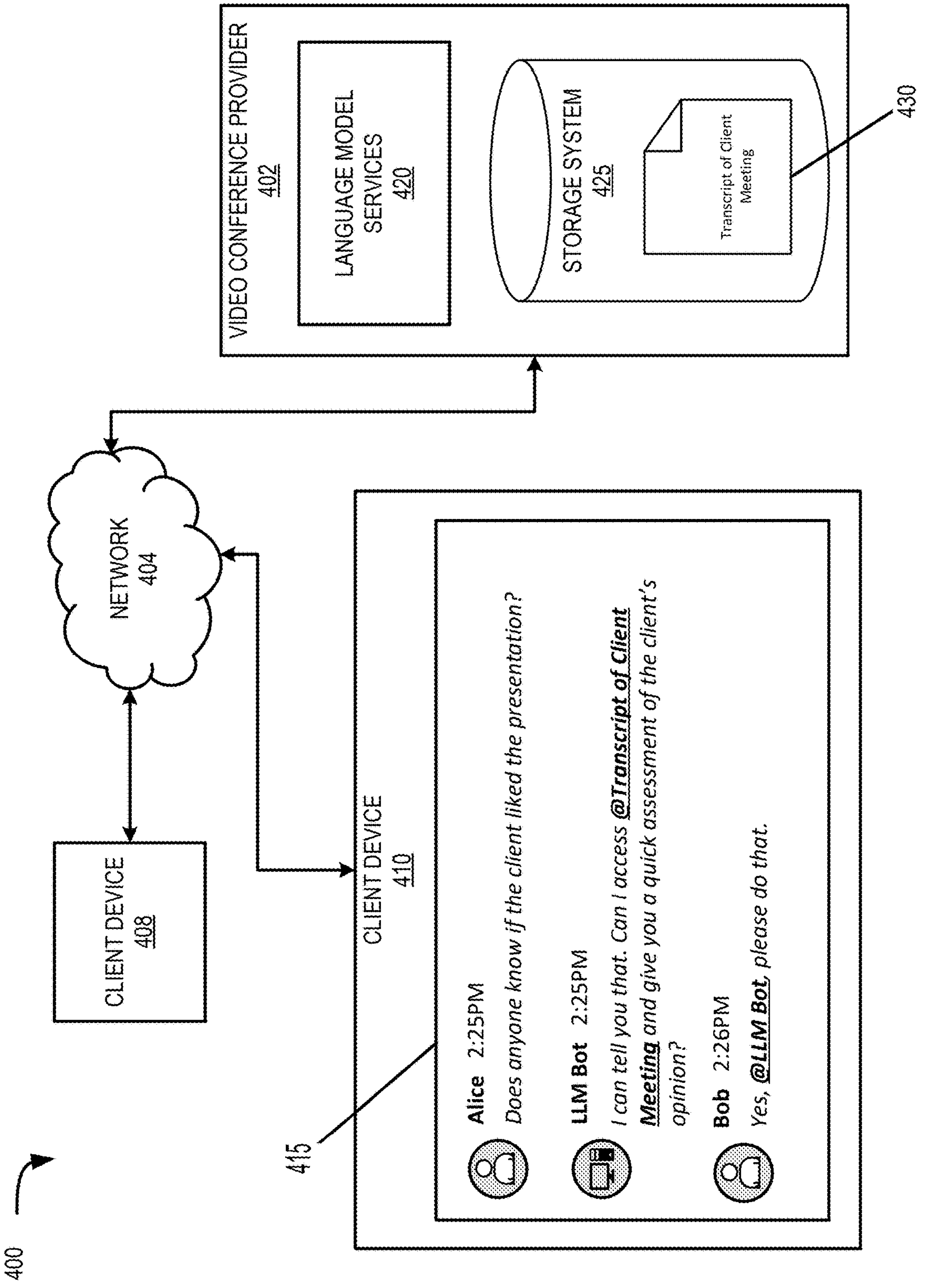
FIG. 4 shows an example of a system for task inference using an AI interface, according to some examples of the present disclosure.

Referring now to FIG. 4, FIG. 4 shows an example of a system 400 for task inference using an AI interface, according to some examples of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for task inference using an AI interface. For example, the client devices 408, 410 may be laptops, desktops, smartphones, tablets, internet protocol (IP) phones, and so on. The client devices 408, 410 may be executing, for example, video conference client software for using the various services provided by the video conference provider 402.

In system 400, an exploded view of client device 410 is shown with an example graphical user interface ("GUI") for a chat application 415. This exemplifies one context in which task inference using an AI interface may be seen, but alternative GUIs on client devices 408, 410 can be used with various implementations of task inference using an AI interface. For instance, task inference using an AI interface can be used in conjunction with applications for chatting, messaging, video conferencing, telephony, calendaring, whiteboarding, email, and so on.

Chat application 415 shows an example conversation among two participants, Alice and Bob. A third participant, "LLM Bot" is also shown. The first chat message from Alice asks, "Does anyone know if the client liked the presentation?" Alice's message may be received by the video conference provider 402 and distributed to the other participants (e.g., Bob).

In parallel with the coordination and distribution of chat messages among the human participants, the video conference provider 402 can provide the message to language model services 420. In some examples, the language model services 420 may be a multi-agent system including a number of agents, services, and one or more language models, such as a large language model ("LLM"). The language model services 420 may be configured to, among other things, determine and execute a task involving one or more executable instructions based on the message.

In this example, from the phrase "client liked the presentation," the language model services 420 may determine that Alice's question is in reference to a presentation given to a client, for which a transcript 430 is persisted in storage system 425. The language model services 420 can further determine that a summarization task may be appropriate for the transcript 430 and that the summarization task may be performed by executing instructions such as retrieving the transcript 430 from the storage system 425, inputting the transcript 430 to an LLM, generating a suitable prompt, receiving the LLM response, and outputting the summary.

The language model services 420 can thus output to client device 410 information about the task, formatted as a chat message. In this example, the "LLM Bot" responds with the information about the task "I can tell you that. Can I access @Transcript of Client Meeting and give you a quick assessment of the client's opinion?"

The video conference provider 402 can then receive an indication to execute the task. In this example, another participant, Bob, sends a chat message specifying "Yes, @LLM Bot, please do that." The language model services 420 may, in response, output one or more commands to cause execution of the task. For example, the language model services 420 may include services for querying the storage system 425, performing text processing or formatting operations, operating HTTP client for web-based API operations, and so on. In this example, the language model services 420 can generate a summarization of the transcript 430, format it, and then output to the client device 410 the output of the task.

Figure 5:
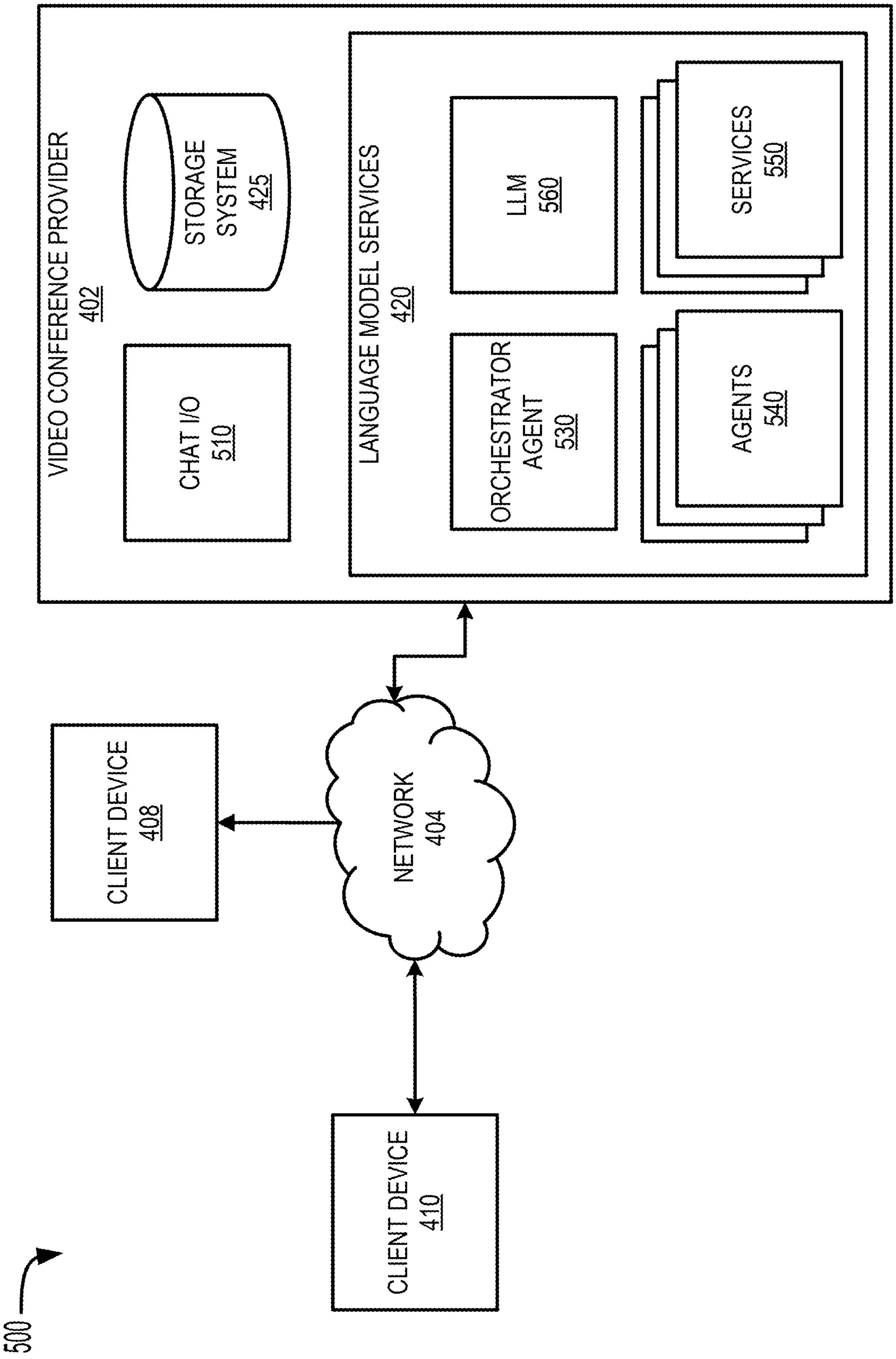
FIG. 5 shows an example of another system for task inference using an AI interface, according to some examples of the present disclosure.

Referring now to FIG. 5, FIG. 5 shows an example of another system 500 for task inference using an AI interface, according to some examples of the present disclosure. System 500 shows additional details of the video conference provider 402 shown in FIG. 4.

Video conference provider 402 includes chat input/output ("I/O") 510. The chat I/O component 510 may include a multiplexing controller that receives chat messages from the various participants using client devices 408, 410 and outputs chat messages to client devices 408, 410. The chat I/O component 510 may be implemented using a web-based API, WebSockets, Server-Sent Events ("SSE"), gRPC Remote Procedure Calls ("gRPC"), message queues or topics, or other suitable technology for sending and receiving chat-related data.

The chat I/O component 510 can store the chat-related data ephemerally and/or persistently using storage system 425. Storage system 425 also can be used to persist the subjects of some tasks, such as the transcript 430 from FIG. 4, as well as other possible subjects, such as video conferences recordings, profile or user information, calendar data, or any other data generated during the course of digital communications using the video conference provider 402. The storage system 425 may also persist additional information or data used for task performance such as documentation, source code, technical support information, and so on.

The storage system 425 may be a standalone database or a collection of databases, including databases hosted physical hardware or in a remote or cloud computing environment. The storage system 425 may include components for ephemeral storage such as in-memory key-value caches as well as persistent stores such as relational or document databases, or any combination thereof.

Video conference provide 402 includes language model services 420. Language model services 420 may be implemented as a multi-agent system including one or more agents 540, one or more services 550, and one or more language models such as large language models ("LLMs") 560. The components of the language model services 420 can be configured for inference of and execution of arbitrary tasks consistent with the capabilities of the agents 540 and services 550 included therein. Some example tasks can include summarization, transcription, translation, sentiment analysis, content analysis, scheduling, or filtering.

The agents 540 may include a collection of specialized agents including an orchestrator agent 530 that can receive incoming requests and coordinate the various elements of the system to enable task inference and execution. The orchestrator agent 530 may be configured with information about the components and capabilities of the language model services 420. Each of the agents 540 can be configured to handle specific aspects of supported tasks. For example, one agent may be specialized for document and text processing operations while another may be specialized to perform mathematical or programming operations. Agents 540 may be specialized using techniques such as few-shot learning, prompt engineering, or fine-tuning on domain-specific datasets.

In some examples, one or more of the agents 540 may be implemented as LLMs. For example, LLM 560 can act as multiple agents, by, for example, using prompts that specifies a particular role when responding. When the orchestrator agent 530 and one or more agents 540 are implemented as LLMs, they can interact between and among each other using a conversational interface.

In addition to LLMs, the agents 540 may include rule-based agents, statistical models, retrieval-based agents, and so on. For instance, a retrieval-based agent could rely on a vector database search system to convert incoming requests into an embedded vector representation using a pre-trained embedding model. The query vector can be used to perform a similarity search in the vector database to determine an appropriate response.

Services 550 may include components for supporting a range of expected functionalities that can facilitate the task execution instructions generated by the agents 540. Example of services 550 may include data access, data processing, task scheduling, load balancing, API management, formatting, logging and monitoring, caching and optimization, and so on. Services 550 can be implemented using a modular approach such as microservice architecture in which some services 550 are accessible by the agents 540 using a suitable API. Suitable APIs may include web-based APIs, custom binary APIs, remote procedure calls (RPCs), and so on. In some examples, the services 550 may include one or more executors. Executors can include narrowly scoped services such as command lines or database clients configured to perform specific instructions or steps.

For instance, one example service 550 may be a database access service that can receive queries and retrieve matching information from the storage system 425. In this example, the database access service may be a database client that can be operated using commands determined by an agent 540. Alternatively, the database access service can be implemented using an LLM 560 that "wraps" the database access components. For example, the database access service can receive a natural language instruction to query the storage system 425, generate a suitable query, and access the storage system 425 using an underlying client component or another service 550.

The services 550 may include clients for accessing a widely scoped knowledge base, including information stored in storage system 425 as well as other data sources.

The storage system 425 or other data sources, made available through clients or APIs for services 550, may be queried as directed by the agents 540 for information related to evaluating incoming tasks and completing the operations determined for tasks. The knowledge base, including information stored in storage system 425 as well as other data sources accessible by services 550, may include data sources such as bug- or issue-trackers, documentation, source control metadata, email archives, social media data, and so on.

Language model services 420 include LLM 560 that can serve as the primary engine for natural language understanding and generation. For example, the language model can include one or an ensemble of LLMs. As mentioned above, one or more agents 540 or services 550 may be or include LLMs. In that case, the LLM 560 can be used as the underlying service provider for the agent 530 using a suitable API. Through role-based prompting or other partitioning strategy, one LLM component 560 can act in multiple roles.

The LLM 560 may be a self-hosted LLM or a third-party LLM accessible using a web-based API or other suitable method for remote access, or combination thereof. A self-hosted LLM can refer to an LLM that is pre-trained and deployed on a computing environment operated by the video conference provider 402 such as server hardware, virtual machines, or a cloud computing environment. Examples of popular self-hosted LLMs include Meta's Llama 2 and 3, Mistral (https://mistral.ai/), Falcon (https://falconllm.tii.ae/), the MPT models of the MosaicML Foundation series, and BLOOM (https://bigscience.huggingface.co/), among many others. Examples of third-party LLMs include the OpenAI GPT series, the Claude models by Anthropic, Google's Gemini series, among many others. These examples are provided for context and are not intended to be limiting in any way.

In one example, the orchestrator agent 530 may receive, from the client device 410, a chat message. The orchestrator agent 530, implemented as an LLM, can determine a task based on the received chat message including one or more executable instructions. For instance, the orchestrator agent 530 can be prompted to review the received chat message, determine if it seems to include, implicitly or explicitly, any tasks. If so, the orchestrator agent 530 can be further prompted to develop a list of executable instructions necessary for the performance of the task in light of the available agents 540 and services 550. In doing so, the orchestrator agent 530 can interface with agents 540 as needed to develop the list of executable instructions.

The orchestrator agent 530 can, using agents 540, generate information about the task to be output to the client device. For example, the inferred task and determined instructions can be distilled to a short question asking for permission and/or confirmation to perform the task. The orchestrator agent 530 can then receive, from the client device, an indication to execute the task, such as a chat message requesting or authorizing performance of the task.

The orchestrator agent 530 can then output commands to cause the execution of the executable instructions constituting the task. For example, the orchestrator agent 530 can output commands to the agents 540 or the services 550 to perform various aspects of the task. The executable instructions can be performed sequentially or in parallel according to the determination of dependencies among the steps by the orchestrator agent 530.

Following execution of the executable instructions, the orchestrator agent 530 can generate or direct an agent 540 to generate, a task output. For instance, if the task is a document summarization task, the task output may be a succinct, formatted summary of the document. The generated output may be formatted with, e.g., readability annotations, download links, URLs, and so forth.

Figure 6:
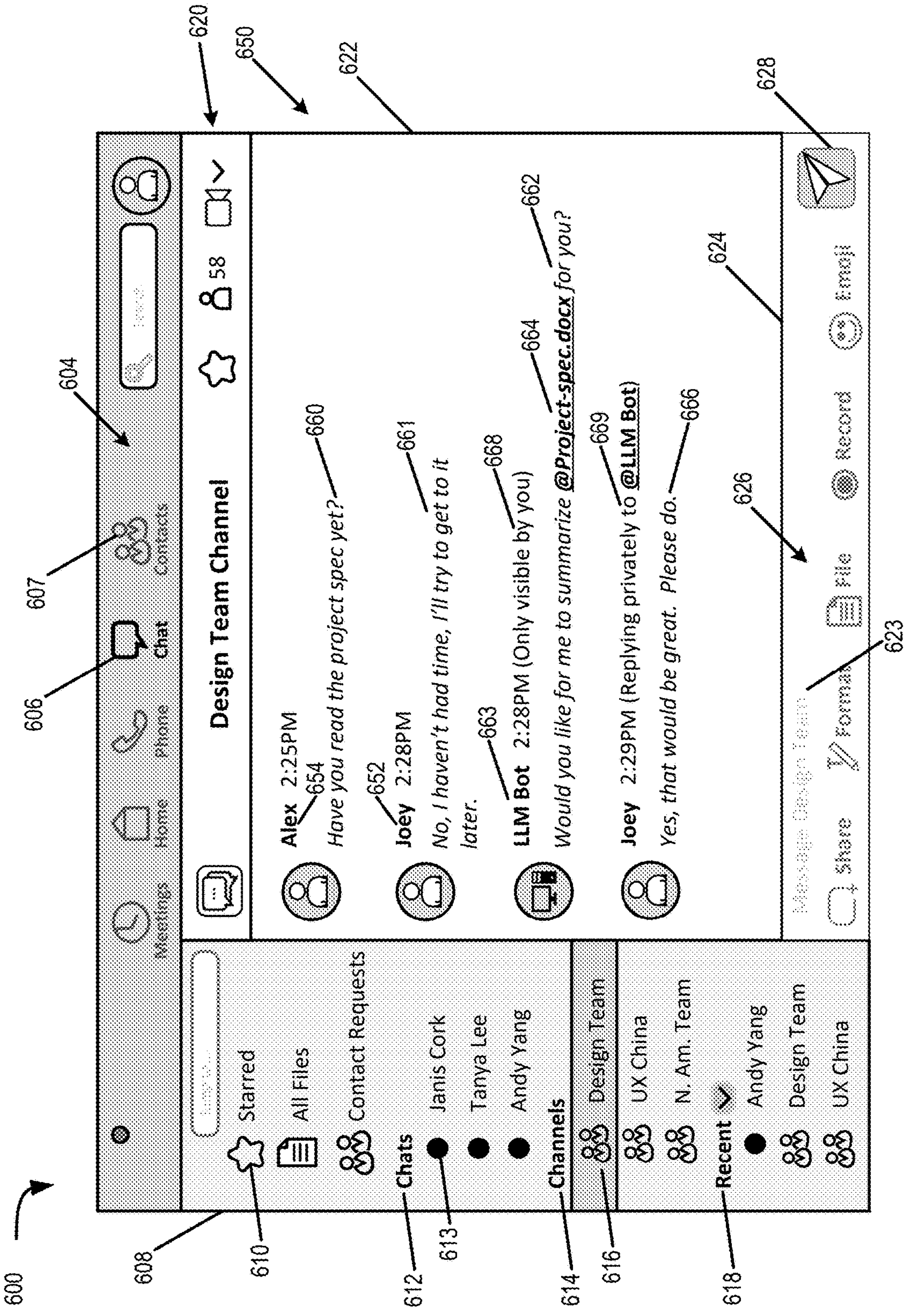
FIG. 6 shows an illustration of an example GUI for task inference using an AI interface, according to some examples of the present disclosure.

Referring now to FIG. 6, FIG. 6 shows an illustration of an example GUI 600 for task inference using an AI interface, according to some examples of the present disclosure. The GUI 600 may be displayed on a client device, such as the client device 410, in response to information sent by a video conference provider 402 or populated with information sent therefrom. The GUI 600 may be generated by an application, e.g., a standalone chat client or integrated into a video conferencing application, run by one or more processors stored on the client device 410.

The GUI 600 may include a general dashboard 604, a chat control dashboard 620, a sidebar 608, a chat window 650, a reply dashboard 626, and a reply panel 624. The general dashboard 604 may include one or more buttons or links that switch functionalities and/or views of the GUI 600. For example, FIG. 6 shows a chat view, perhaps in response to a user command selecting a chat button 606 in the general dashboard 604. In this view, the chat window 650, the reply panel 624, and other components illustrated in FIG. 6 may be displayed on a display device of the client device 410. In another example view, a contacts button 607 may be selected by a user. In response to the contacts button 607 being selected, the chat window 650, the reply dashboard 626 and the reply panel 624 may be replaced by a display of a contacts window (not shown) including a list of user contacts associated with the user of the client device 410. In this case, the sidebar 608 may still be displayed alongside the contacts window. Other configurations are also possible.

Various buttons on the general dashboard 604 may correspond to various displays of windows being displayed on the client device 410. Any number of components shown in FIG. 6 may be displayed on the client device 410 with any of the various windows. Similarly, any of the components may cease to be displayed in accordance with any of the windows.

The sidebar 608 may include one or more chat channel headings, such as chats 612, channels 614, and recent 618. Chats 612 heading may include one or more chat channels, such as chat channel 616. The chats 612 may include private chat channels, where messages in a chat channel are exchanged in a one-on-one manner. For example, the chat channel 616 may be between the member viewing the GUI 600 and one other member, such as Janis Cork, as depicted. Messages exchanged via the chat channel 616 may only be accessible by the members of the chat channel 616. One-on-one chat channels, such as those provided under the chats 612 heading may allow members to securely communicate with each other or track communications between themselves.

The channels 614 heading may be for chat channels that include two or more users. For example, a chat channel 616 may be included under the channels 614 heading because the chat channel 616 is for a Design Team. The chat channel 616 may include two or more members who have access to send and receive messages within the chat channel 616. In some examples, the chat channel 616 may only be accessed by members who have permission to enter the chat channel 616, such as members who receive and accept an invitation to join the chat channel 616. In some embodiments, a chat channel may have a host or member who has host controls over the chat channel. For example, host controls may include the ability to establish and invite members to a chat channel. In example GUI 600, example chat channel 616 is selected, corresponding to displayed elements of chat control dashboard 620 and chat window 650.

The recent 618 heading may indicate chat channels that a viewing member of the GUI 600 has recently viewed. The recent 618 heading may allow the viewing member easy access to commonly or recently viewed or accessed chat channels. "Recently accessed" chat channels may be determined by the client device 410 to be a fixed number of most recent channels accessed by the viewing member or may be only those chat channels access within a certain time, calculated from the current time.

Although only the chat channel headings 612, 614, and 618 are shown, other chat channel headings are possible. For example, some examples may include a chat channel heading that displays, on the client device 410, only those channels that the user associated with the client device 410 is a member of that have been recently accessed.

The sidebar 608 may also include one or more combinatory headings, such as starred combinatory heading 610. A combinatory heading may aggregate one or more messages from one or more chat channels, according to a predetermined criterion. The combinatory headings may include a link that, in response to a user command, cause the client device to display one or more messages in the chat window 650. The messages may be gathered from one or more chat channels, such as the chat channel 616, and displayed based on predetermined criteria. In FIG. 6, for example, the starred combinatory heading 610 may gather only those messages that have been marked by a user of the client device 410. The marked messages may be stored at the client device 410, and/or may be stored at the video conference provider 402. The link may cause the one or more processors included on the client device 410 to determine which messages are marked messages and cause them to be displayed in the chat window 650. In some examples, the link may cause the client device 410 to send a signal to the video conference provider 402. The video conference provider 402 may then determine which messages are marked messages and send information to the client device 410 to generate a display of the marked messages in the chat window 650.

Other combinatory headings (and associated links and functionality) are also considered. Other examples may include an unread heading, an all files heading, a contact request heading, and others. As with the starred combinatory heading 610, an associated link may cause the client device and/or the video conference provider 402 to determine which messages (if any) meet predetermined criteria associated with the combinatory heading and subsequently display those messages on the client device 410.

As depicted, a viewing participant of the GUI 600 may select to access the chat channel 616 for the Design Team. Upon selection of the chat channel 616, the chat window 650 may be provided on the GUI 600. The chat window 650 may include the chat control dashboard 620. The chat control dashboard 620 may display one or more control buttons and/or information regarding the chat channel 616 (e.g., the currently viewed chat channel). The control buttons may include links that mark a message (e.g., to mark it such that it is determined to be a marked message via the starred combinatory heading 610), begin a video conference, schedule a meeting, create a video message, or other tasks. The chat control dashboard 620 may also include a title of the chat channel 616 currently being displayed on the client device, such as the "Design Team Channel" as depicted, and/or a number of users with access to the chat channel 616. One of ordinary skill in the art would recognize many different possibilities and configurations.

The chat window 650 may also include a reply panel 624. The reply panel 624 may include an input field 623, where the member can input a message and select to send the message to the chat channel 616. The input field 623 may be accessed by a peripheral device such as a mouse, a keyboard, a stylus, or any other suitable input method. In some examples, the input field 623 may be accessed by a touchscreen or other system built into the client device. In some examples, a notification may be sent from the client device and/or the chat and video conference provider that indicates a response is being entered into the input field 623 by the user. In other examples, no notification may be sent.

The reply dashboard 626 may include one or more buttons that, in response to a user command edit or modify a response input into the input field 623.

For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 626. The one or more formatting buttons may change the appearance of a reply entered in the input field 623. The user may thereby edit and customize their response in the input field 623 before sending.

The reply dashboard 626 may include a send button 628. The send button 628 may, in response to a user command, cause the client device 410 to send the contents of the input field 623 (or "message") to the other members of the chat channel 616. The client device may transmit the message to the video conference provider 402, which may in turn transmit the message to the client devices 408, 410 associated with the other members of the chat channel 616. Upon transmission of the message via the send button 628, the message 660 may be published within a chat messaging panel 622. As noted above, messages exchanged within the chat channel 616 may include image files, such as JPEG, PNG, TIFF, or files in any other suitable format, may also include video files such as MPEG, GIF, or video files in any other suitable format, or may also include text entered into the input field 623 and/or other files attached to the message such as a PDF, DOC, or other file format.

The example chat messaging panel 622 depicts an example chat conversation among two members of the chat channel 616 that includes some examples of task inference using an AI interface. The GUI 600 may be representative of what a first participant may see, but other participants may see a similar GUI 600.

Chat message 660 is input by the first participant 652, in reference to a project, using a control in the reply panel 624. Chat message 661 is input by a second participant 654 and received by the first participant 652. In parallel, the chat messages 660 and 661 are received by the language model services 420 of the video conference provider 402 as shown in FIGS. 4 and 5. In this example, the language model services 420 have inferred a task and output information about the task in chat message 662 as synthetic participant 663. Chat message 662 includes a reference to a document 664 that is inferred from the chat messages 660, 661. In response to the chat message 662, the first participant 652 sends an indication to execute the task in the form of chat message 666. The chat messaging panel 622 also includes privacy messages 668, 669 illustrating one implementation of task inference using an AI interface in which the task inference and indication to execute the task are sent privately by the synthetic participant 663 and first participant 652, respectively. In that case, the second participant 654 may not see the chat messages 662 and 666 on their display.

Figure 7:
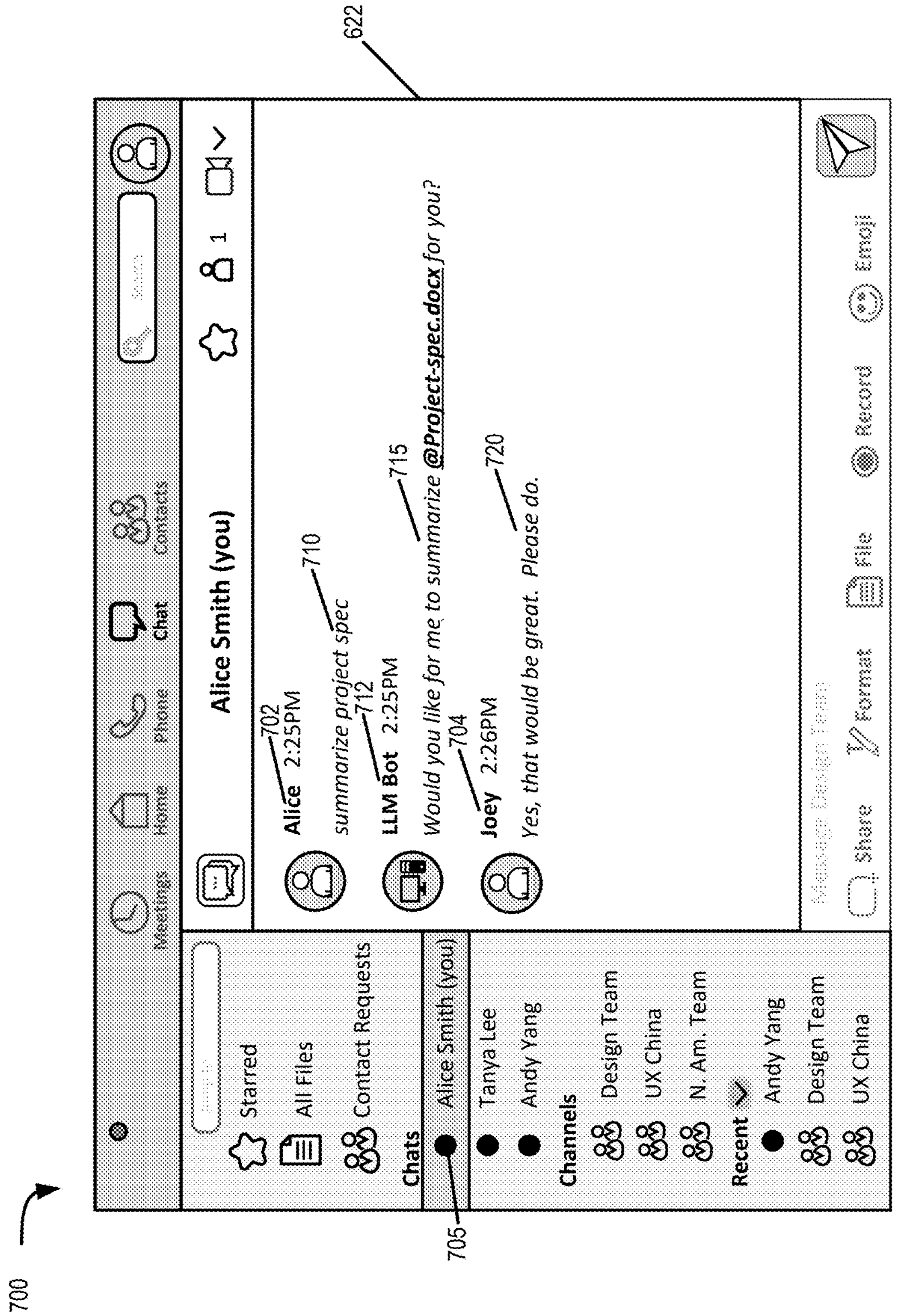
FIG. 7 shows illustration of another example GUI for task inference using an AI interface, according to some examples of the present disclosure.

Referring now to FIG. 7, FIG. 7 shows illustration of another example GUI 700 for task inference using an AI interface, according to some examples of the present disclosure. GUI 700 is similar in many respects to the GUI 600 of FIG. 6. Rather than a conversation among numerous participants, as in chat channel 616, private chat 705 is selected between two participants, a first participant 702 and a second participant 704. The private chat 705 is shown in chat messaging panel 622.

Chat message 710 sent by the first participant 702 includes an imperative structure, including at least an action and an object. This example includes action "summarize" and object "project spec." In some examples, the language model services 420 can be configured to infer a task based on the imperative structure, including at least an action and an object, if an input chat message. The synthetic participant 712 (the "LLM Bot") outputs information about the inferred task at chat message 715. The second participant 704 sends an indication to complete the task at chat message 720.

Figure 8:
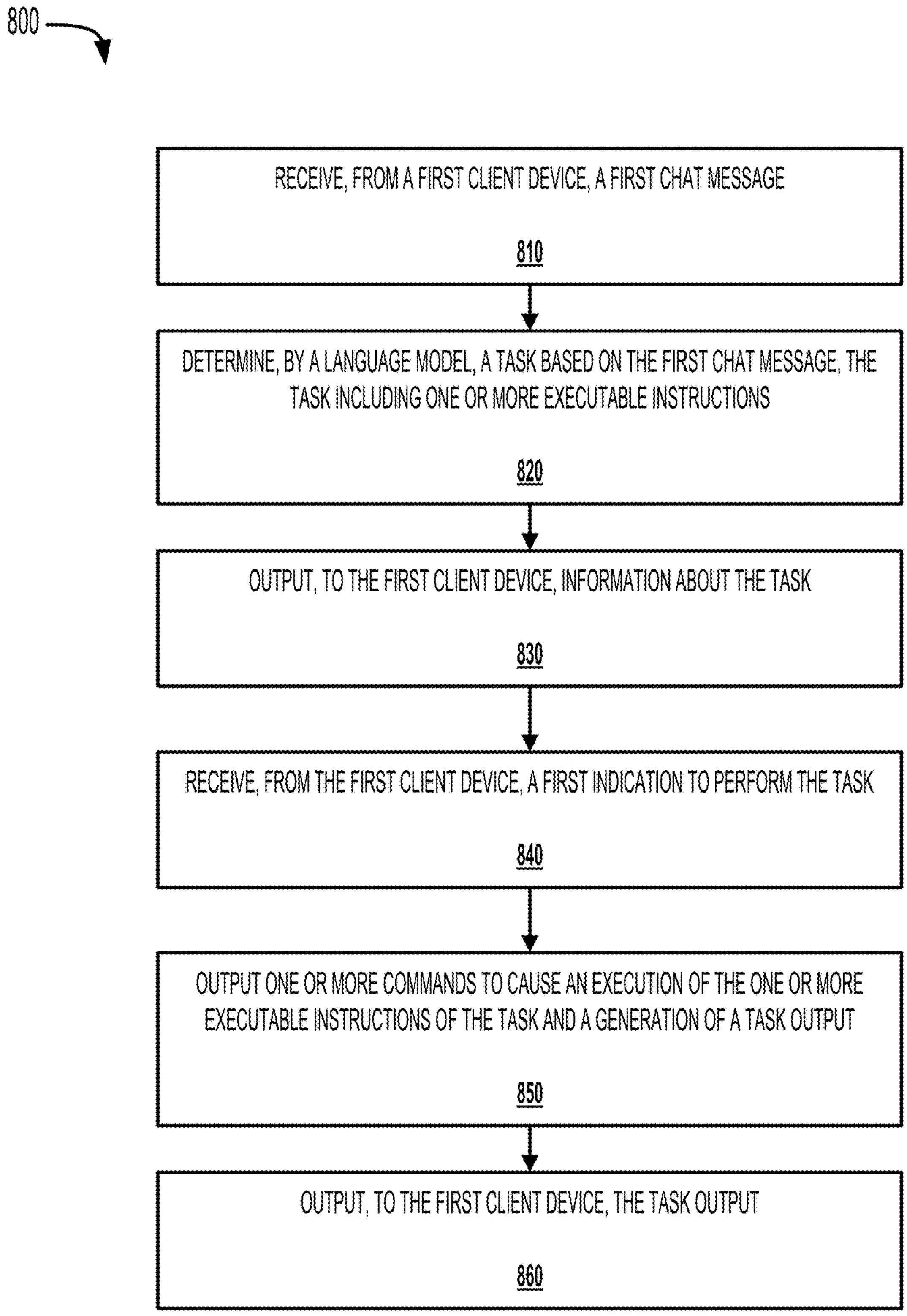
FIG. 8 shows a flowchart of an example method implementing task inference using an AI interface, according to some examples of the present disclosure.

Referring now to FIG. 8, FIG. 8 shows a flowchart of an example method 800 implementing task inference using an AI interface, according to some examples of the present disclosure. The description of the method 800 in FIG. 8 will be made with reference to FIGS. 4-7, however any suitable system according to this disclosure may be used, such as the example systems 100 and 200, shown in FIGS. 1 and 2. It should be appreciated that method 800 provides a particular method implementing task inference using an AI interface. Other sequences of operations may also be performed according to alternative examples. For example, alternative examples of the present disclosure may perform the steps outlined above in a different order. Moreover, the individual operations illustrated by method 800 may include multiple sub-operations that may be performed in various sequences as appropriate to the individual operation. Furthermore, additional operations may be added or removed depending on the particular applications.

The operations described in method 800 may be performed by different devices. For example, the description is given from the perspective of the video conference provider 402 but other configurations are possible. For instance, any type of service provider can implementing task inference using an AI interface. A non-limiting list of other example service providers includes customer support platforms, e-commerce platforms, healthcare providers, financial services, cloud service providers, human resources platforms, logistics and supply chain providers, marketing automation platforms, educational technology providers, and so on. One of ordinary skill in the art would recognize many variations, modifications, and alternatives.

The method 800 may include block 810. At block 810, a computing system receives, from a first client device, a first chat message. For example, the computing system may include a chat I/O component 510 as described in FIG. 5 that can receive incoming digital communications, such as chat messages, and dispatch them to other client devices as well as other downstream consumers.

The first chat message may include a reference to a document such as a text document, word processing document, video conference or audio recording, source code, and so on. The reference to the document can be an explicit reference (e.g., a mention of a specific filename) or an implicit reference. The implicit reference may be, for example, a collection of information sufficient to identify a particular document or to narrow the range of possibilities down, such as "I think we discussed that last Tuesday in our meeting" or "John created a presentation for our meeting yesterday." An implicit reference may include information about the type of document, creation date, location, authors, participants, content, and so on that may be used to identify one or more candidate documents for a task.

At block 820, the computing system determines, using a language model, a task based on the first chat message, the task including one or more executable instructions. For example, the computing system may include language model services 420 as described in FIG. 4. The language model may be an LLM or an ensemble of LLMs. The LLM(s) may be constituents of a multi-agent system configured for task inference.

The computing system can determine the subject of the task based on the implicit or explicit reference to the document being included in the first chat message. The type of task can likewise be inferred based on an implicit or explicit reference in the first chat message. For instance, a summarization task may be explicitly defined with a directive to summarize a particular document. In another example, a sentiment analysis task can be implicitly identified when the author of the first chat message mentions that sentiment analysis of a particular document is desirable to another participant. In some examples, the type of task may be inferred from the context of the full conversation in addition to the first chat message.

The executable instructions can be determined based on the capabilities of a multi-agent system with a number of agents and services, as shown in system 500 of FIG. 5. In some examples, for instance, the executable instructions map to operations that can be performed by agents 540 or by the services 550, as directed by the agents 540. Alternatively, some inferred tasks may not be performable by available agents 540 or services 550. In that case, the computing system can provide an output indicating that the task has been inferred but cannot be performed.

The subject, type, or additional details of the task can be determined with reference to a knowledge base, including information stored in storage system 425 as well as other data sources. For example, a summarization task type may be inferred from the language of the first chat message, but the subject of the summarization task may not be explicitly identified. The storage system 425 or other data sources, made available through services 550, may be queried as directed by the agents 540 to determine the subject of the summarization task. For example, the summarization task may reference a project that was recently worked on. An agent 540 can direct a service 550 such as client for a work tracker program (e.g., JIRA) to search recent issues for projects recently updated. The agents 540 and/or LLM can further infer, from the returned issues, which project was the subject of the summarization task. Additional queries or operations may be further generated to obtain the particular information to summarize. The knowledge base, including information stored in storage system 425 as well as other data sources accessible by services 550, may include data sources such as bug-or issue-trackers, documentation, source control metadata, email archives, social media data, and so on.

At block 830, the computing system outputs, to the first client device, information about the task. For example, the computing system may convert the determined task into a human-readable description of the task, such as the examples shown in GUIs 600 and 700 of FIGS. 6 and 7. The description may in the form of a question or other suitable format. The information about the task may include information about the document, including hyperlinks or other references. In some examples, the information about the task may include a request to confirm that the task was accurately determined. For example, in some cases the language model may be unable to determine with a suitable confidence that the task has been accurately determined. The computing system may then output, to the first client device, a request for confirmation in addition to a request for an indication to perform the task.

At block 840, the computing system receives, from the first client device, a first indication to perform the task. For example, if the information about the task is provided to the first client device formatted as a chat message (e.g., from a synthetic participant in a chat room), the first client device may reply in kind, directing performance of the task using a chat message reply.

The indication or can include additional instructions or parameters. For instance, if the determined task is a summarization task, the indication can include a limitation to only summarize a portion of the document. Due to the flexibility of the multi-agent system in use in some example implementations of the language model services 420, the executable instructions of the task can be suitably modified before execution.

At block 850, the computing system outputs one or more commands to cause an execution of the one or more executable instructions of the task and a generation of a task output. For example, a component of the computing system such as one of the services 550 can receive a command to query and receive the document the storage system 425 using the reference to the document. For instance, if the determined task is a summarization task about a particular document, the name, location, or other identifying information can be sent from an agent 540 to a service 550 (e.g., a database query executor) to perform a suitable database query against the storage system 425 to retrieve the document. The document can be then operated upon by another agent 540 and/or service 550. The performance of, including the mapping of inputs and outputs among the steps of the executable instructions may be coordinated by the orchestrator agent 530.

At block 860, the computing system outputs, to the first client device, the task output. For example, following performance of the task, the orchestrator agent 530 can gather the outputs of the execution steps to generate an output. For instance, an LLM agent can be directed to collate, compile, and format a number of outputs from disparate services 550 to generate a concise, human-readable output based on the completed task. The output can be sent to the first client device and displayed in a suitable GUI. For instance, the output for a summarization task may be a preview of a formatted, hyperlinked summarization of the document.

Figure 9:
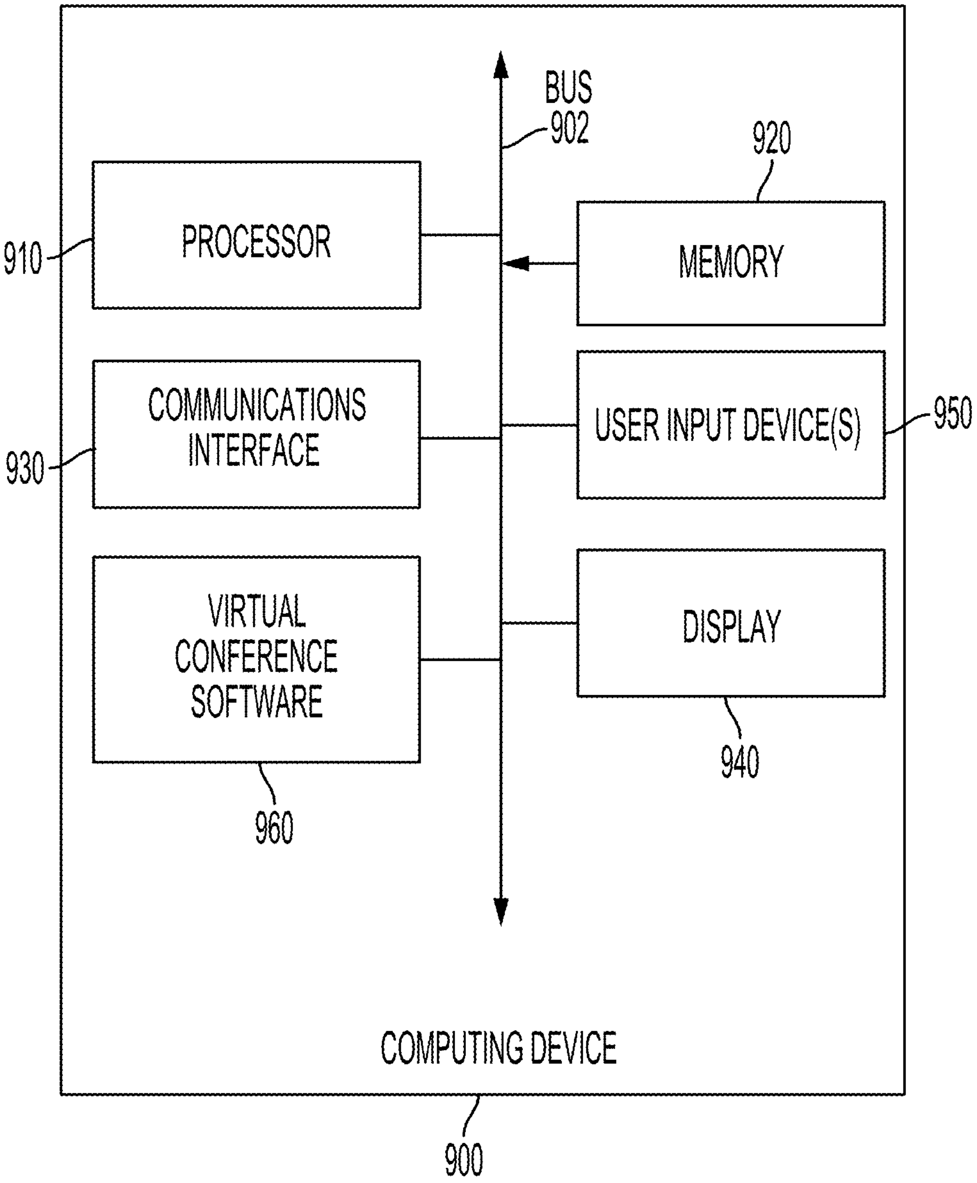
FIG. 9 shows an example computing device suitable for use in example systems or methods for providing task inference using an AI interface, according to some aspects of the present disclosure.

Referring now to FIG. 9, FIG. 9 shows an example computing device 900 suitable for use in example systems or methods for providing task inference using an AI interface, according to some examples of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for task inference using an AI interface according to different examples, such as part or all of the example method 800 described above with respect to FIG. 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes virtual conferencing software 960 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, from a first client device, a first chat message; determining, using a language model, a task based on the first chat message, the task comprising one or more executable instructions; outputting, to the first client device, information about the task; receiving, from the first client device, a first indication to perform the task; outputting one or more commands to cause an execution of the one or more executable instructions of the task and a generation of a task output; and outputting, to the first client device, the task output.

Example 2 is the method of example(s) 1, wherein the language model is a large language model ("LLM").

Example 3 is the method of example(s) 1, wherein the language model comprises a multi-agent system including an LLM.

Example 4 is the method of example(s) 2, wherein determining the task based on the first chat message comprises inferring, from the first chat message, the task.

Example 5 is the method of example(s) 4, wherein inferring, from the first chat message, the task comprises: inputting, to the large language model, a prompt comprising the first chat message and one or more queries about the first chat message; receiving, from the large language model, a first response including: a second indication that the first chat message includes an inferred task; and the one or more executable instructions associated with the inferred task; and generating, using the large language model, a second response to the first chat message.

Example 6 is the method of example(s) 5, wherein outputting the one or more commands to cause the execution of the executable instructions of the task and the generation of the task output comprises outputting the one or more executable instructions to one or more agents or one or more services.

Example 7 is the method of example(s) 4, wherein the first chat message includes an imperative structure, the imperative structure including at least an action and an object.

Example 8 is the method of example(s) 1, wherein: the first chat message includes a reference to a document; and determining the task based on the first chat message is based on the document being included in the first chat message.

Example 9 is the method of example(s) 8, wherein the document is a text document and the task is a summarization task or a sentiment analysis task.

Example 10 is the method of example(s) 8, further comprising receiving the document from a data store using the reference to the document.

Example 11 is the method of example(s) 1, wherein the first chat message includes a reference to the language model.

Example 12 is the method of example(s) 1, wherein outputting, to the first client device, the information about the task includes a request to confirm that the task was accurately determined.

Example 14 is a non-transitory computer-readable medium storing instructions that, when executed by one or more processors, cause the one or more processors to perform operations including: receiving, from a first client device, a first chat message; determining, using a language model, a task based on the first chat message, the task comprising one or more executable instructions; outputting, to the first client device, information about the task; receiving, from the first client device, a first indication to perform the task; outputting one or more commands to cause an execution of the one or more executable instructions of the task and a generation of a task output; and outputting, to the first client device, the task output.

Example 14 is the non-transitory computer-readable medium of example(s) 13, wherein the language model is an LLM.

Example 15 is the non-transitory computer-readable medium of example(s) 14, wherein: determining the task based on the first chat message comprises inferring, from the first chat message, the task; inferring, from the first chat message, the task comprises: inputting, to the LLM, a prompt comprising the first chat message and one or more queries about the first chat message; receiving, from the LLM, a first response including: a second indication that the first chat message includes an inferred task; and the one or more executable instructions associated with the inferred task; generating, using the LLM, a second response to the first chat message; and outputting the one or more commands to cause the execution of the executable instructions of the task and the generation of the task output comprises outputting the one or more executable instructions to one or more agents or one or more services.

Example 16 is the non-transitory computer-readable medium of example(s) 13, wherein: the first chat message includes a reference to a document; and determining the task based on the first chat message is based on the document being included in the first chat message; the document is a text document and the task is a summarization task or a sentiment analysis task; and the operations further include receiving the document from a data store using the reference to the document.

Example 17 is a system comprising: one or more processors; and one or more computer-readable storage media storing instructions which, when executed by the one or more processors, cause the one or more processors to perform operations including: receiving, from a first client device, a first chat message; determining, using a language model, a task based on the first chat message, the task comprising one or more executable instructions; outputting, to the first client device, information about the task; receiving, from the first client device, a first indication to perform the task; outputting one or more commands to cause an execution of the one or more executable instructions of the task and a generation of a task output; and outputting, to the first client device, the task output.

Example 18 is the system of example(s) 17, wherein the language model is an LLM.

Example 19 is the system of example(s) 18, wherein: determining the task based on the first chat message comprises inferring, from the first chat message, the task; inferring, from the first chat message, the task comprises: inputting, to the LLM, a prompt comprising the first chat message and one or more queries about the first chat message; receiving, from the LLM, a first response including: a second indication that the first chat message includes an inferred task; and the one or more executable instructions associated with the inferred task; generating, using the LLM, a second response to the first chat message; and outputting the one or more commands to cause the execution of the executable instructions of the task and the generation of the task output comprises outputting the one or more executable instructions to one or more agents or one or more services.

Example 20 is the system of example(s) 17, wherein: the first chat message includes a reference to a document; and determining the task based on the first chat message is based on the document being included in the first chat message; the document is a text document and the task is a summarization task or a sentiment analysis task; and the operations further include receiving the document from a data store using the reference to the document.

That which is claimed is:

1. A method, comprising:

receiving, from a first client device, a first chat message;

determining, using a language model, a task based on the first chat message, the task comprising one or more executable instructions;

outputting, to the first client device, information about the task;

receiving, from the first client device, a first indication to perform the task;

outputting one or more commands to cause an execution of the one or more executable instructions of the task and a generation of a task output; and outputting, to the first client device, the task output.

2. The method of claim 1, wherein the language model is a large language model ("LLM").

3. The method of claim 1, wherein the language model comprises a multi-agent system including an LLM.

4. The method of claim 2, wherein determining the task based on the first chat message comprises inferring, from the first chat message, the task.

5. The method of claim 4, wherein inferring, from the first chat message, the task comprises:

inputting, to the large language model, a prompt comprising the first chat message and one or more queries about the first chat message;

receiving, from the large language model, a first response including:

a second indication that the first chat message includes an inferred task; and the one or more executable instructions associated with the inferred task; and generating, using the large language model, a second response to the first chat message.

6. The method of claim 5, wherein outputting the one or more commands to cause the execution of the executable instructions of the task and the generation of the task output comprises outputting the one or more executable instructions to one or more agents or one or more services.

7. The method of claim 4, wherein the first chat message includes an imperative structure, the imperative structure including at least an action and an object.

8. The method of claim 1, wherein:

the first chat message includes a reference to a document; and determining the task based on the first chat message is based on the document being included in the first chat message.

9. The method of claim 8, wherein the document is a text document and the task is a summarization task or a sentiment analysis task.

10. The method of claim 8, further comprising receiving the document from a data store using the reference to the document.

11. The method of claim 1, wherein the first chat message includes a reference to the language model.

12. The method of claim 1, wherein outputting, to the first client device, the information about the task includes a request to confirm that the task was accurately determined.

13. A non-transitory computer-readable medium storing instructions that, when executed by one or more processors, cause the one or more processors to perform operations including:

receiving, from a first client device, a first chat message;

determining, using a language model, a task based on the first chat message, the task comprising one or more executable instructions;

outputting, to the first client device, information about the task;

receiving, from the first client device, a first indication to perform the task;

outputting one or more commands to cause an execution of the one or more executable instructions of the task and a generation of a task output; and outputting, to the first client device, the task output.

14. The non-transitory computer-readable medium of claim 13, wherein the language model is an LLM.

15. The non-transitory computer-readable medium of claim 14, wherein:

determining the task based on the first chat message comprises inferring, from the first chat message, the task;

inferring, from the first chat message, the task comprises:

inputting, to the LLM, a prompt comprising the first chat message and one or more queries about the first chat message;

receiving, from the LLM, a first response including:

a second indication that the first chat message includes an inferred task; and the one or more executable instructions associated with the inferred task;

generating, using the LLM, a second response to the first chat message; and outputting the one or more commands to cause the execution of the executable instructions of the task and the generation of the task output comprises outputting the one or more executable instructions to one or more agents or one or more services.

16. The non-transitory computer-readable medium of claim 13, wherein:

the first chat message includes a reference to a document; and determining the task based on the first chat message is based on the document being included in the first chat message;

the document is a text document and the task is a summarization task or a sentiment analysis task; and the operations further include receiving the document from a data store using the reference to the document.

17. A system comprising:

one or more processors; and one or more computer-readable storage media storing instructions which, when executed by the one or more processors, cause the one or more processors to perform operations including:

receiving, from a first client device, a first chat message;

determining, using a language model, a task based on the first chat message, the task comprising one or more executable instructions;

outputting, to the first client device, information about the task;

receiving, from the first client device, a first indication to perform the task;

outputting one or more commands to cause an execution of the one or more executable instructions of the task and a generation of a task output; and outputting, to the first client device, the task output.

18. The system of claim 17, wherein the language model is an LLM.

19. The system of claim 18, wherein:

determining the task based on the first chat message comprises inferring, from the first chat message, the task;

inferring, from the first chat message, the task comprises:

inputting, to the LLM, a prompt comprising the first chat message and one or more queries about the first chat message;

receiving, from the LLM, a first response including:

a second indication that the first chat message includes an inferred task; and the one or more executable instructions associated with the inferred task;

generating, using the LLM, a second response to the first chat message; and outputting the one or more commands to cause the execution of the executable instructions of the task and the generation of the task output comprises outputting the one or more executable instructions to one or more agents or one or more services.

20. The system of claim 17, wherein:

the first chat message includes a reference to a document; and determining the task based on the first chat message is based on the document being included in the first chat message;

the document is a text document and the task is a summarization task or a sentiment analysis task; and the operations further include receiving the document from a data store using the reference to the document.

* * * * *